United States Patent
DeVingo

[19]

[11] Patent Number: 6,021,578
[45] Date of Patent: *Feb. 8, 2000

[54] APPARATUS FOR ALIGNING DOOR PIVOTS

[76] Inventor: Joseph Jude DeVingo, Four Hurley Ct., Wyckoff, N.J. 07481

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,215

[22] Filed: Jun. 18, 1997

[51] Int. Cl.[7] .................................................. G01C 15/10
[52] U.S. Cl. .................................. 33/392; 33/371; 33/645
[58] Field of Search .............................. 33/194, 365, 370, 33/371, 373, 391, 392, 394, 533, 645, 236, 368, 347; 16/221, DIG. 39

[56] References Cited

U.S. PATENT DOCUMENTS

| | | | |
|---|---|---|---|
| 477,405 | 6/1892 | Dechaux | 33/392 |
| 572,390 | 12/1896 | Weir | 33/392 |
| 991,446 | 5/1911 | Johnson | 33/370 |
| 1,340,995 | 5/1920 | Werner | 33/392 |
| 1,824,321 | 9/1931 | Baker | 33/371 |
| 1,874,057 | 8/1932 | Murphy | 33/370 |
| 2,003,062 | 5/1935 | Wickwire | 411/383 |
| 2,627,124 | 2/1953 | La Rock | 33/371 |
| 3,176,945 | 4/1965 | Anderson | 411/383 |
| 3,715,808 | 2/1973 | Petrik | 33/392 |
| 4,597,186 | 7/1986 | Markos | 33/392 |
| 5,473,819 | 12/1995 | Byers et al. | 33/392 |
| 5,481,809 | 1/1996 | Rooney | 33/392 |

FOREIGN PATENT DOCUMENTS

| | | | |
|---|---|---|---|
| 57-204411 | 12/1982 | Japan | 33/392 |
| 1455868 | 11/1976 | United Kingdom | 33/392 |

*Primary Examiner*—G. Bradley Bennett
*Attorney, Agent, or Firm*—Kilgannon & Steidl

[57] ABSTRACT

The tool of this invention comprises a collar which may be attached to a pivot rod extending from the underside of the upper pivot assembly of a swinging or revolving door, the collar having a recess in the top surface of the collar for receiving the upper pivot rod, said recess being dimensioned to snugly fit the pivot rod without substantial lateral movement of the collar, so as to align the central vertical axes of the collar and upper pivot rod, the bottom of the recess having a central aperture, a means for rigidly but removably attaching the collar to the pivot rod, and means associated with the collar for generating a marker in vertical alignment with the central aperture in the bottom of the recess to thereby designate the center point of the bottom pivot.

4 Claims, 3 Drawing Sheets

APPARATUS FOR ALIGNING DOOR PIVOTS

This invention relates to a tool that provides a mechanism for precisely aligning the upper and bottom pivots for swinging and revolving doors, which tool provides a labor-saving convenience and concomitant lowering of installation cost.

BACKGROUND OF INVENTION

In the installation of swinging doors, that is, doors that pivot in either direction from a closed position, it is critical to have the upper and bottom pivots in proper vertical alignment. So too with a revolving door, the door revolves around a center pivot point and utilizes upper and bottom pivots. In the past, this alignment has been accomplished by dropping a plumb line from the upper pivot to the locus of the bottom pivot. Aligning the upper and bottom pivots has necessitated the services of two installers, one installer to manually hold the plumb line in the center of the bottom surface of the upper pivot and the other installer to position the bottom pivot in alignment with the apex of the plumb bob.

SUMMARY OF INVENTION

The tool of this invention comprises a collar which may be attached to a pivot rod extending from the underside of the upper pivot assembly of a swinging or revolving door, the collar having a recess in the top surface of the collar for receiving the upper pivot rod, said recess being dimensioned to snugly fit the pivot rod without substantial lateral movement of the collar, so as to align the central vertical axes of the collar and upper pivot rod, the bottom of the recess having a central aperture, a means for rigidly but removably attaching the collar to the pivot rod, and means associated with the collar for generating a marker in vertical alignment with the central aperture in the bottom of the recess to thereby designate the center point of the bottom pivot.

In one embodiment, the means for generating a marker denoting the center point of the bottom pivot is a plumb assembly of the bottom pivot, the plumb string of which passes through the central aperture in the bottom of the recess and includes means attached to the outer side surface of the collar for fixedly positioning the plumb line passing through the central aperture in the bottom of the recess the desired distance from the collar and further includes means for increasing or decreasing the distance of the plumb bob from the collar upon the application of the appropriate force to the plumb string.

Alternatively, as a substitute for a plumb, a light beam generating source, such as a laser beam, may be associated with the collar so as to pass a focused light beam from the center of a recess in the bottom of the collar to thereby mark the locus whereat the center of the bottom pivot should be anchored.

In a preferred form, the depth of the recess in the top of the collar is sufficient to permit, in the instance where an adjustable length plumb bob is the mechanism for marking the locus of the bottom pivot, passing the plumb line through the side wall of the collar beneath the upper pivot rod.

As an alternate to passing the plumb line through the side wall of the collar, a mechanism for lengthening or retracting a plumb line passing through the central aperture in the bottom of the recess of the collar may be disposed within the collar or the plumb bob.

Where a focused light beam is used to generate the marking for the locus of the bottom pivot, e.g. a laser beam, the light beam must be aligned with the vertical axis of the collar so that the light beam is an extension of the center point of the upper pivot. The light beam generating mechanism may be disposed within or without the collar. Also the light beam mechanism may be activated by a manual switch or a switch that activates automatically when the collar is disposed on the upper pivot.

DETAILED DESCRIPTION OF THE DRAWINGS

Figure 1:
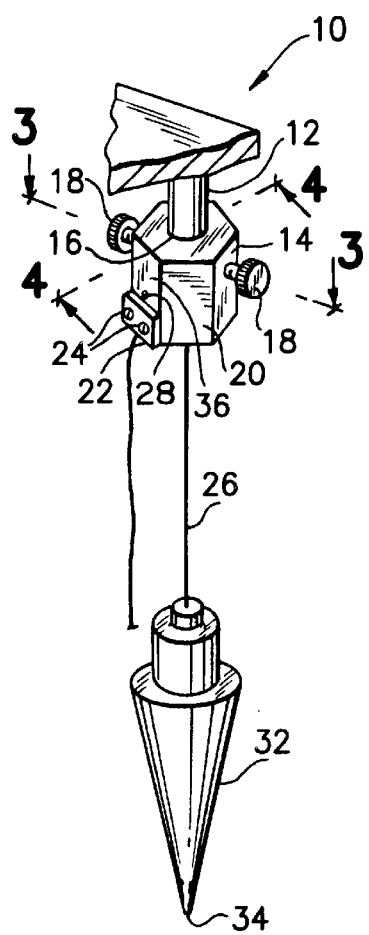
FIG. 1 is a partial perspective view of an upper pivot for a swinging door and a perspective view of the collar of this invention with an accompanying plumb.
Figure 2:
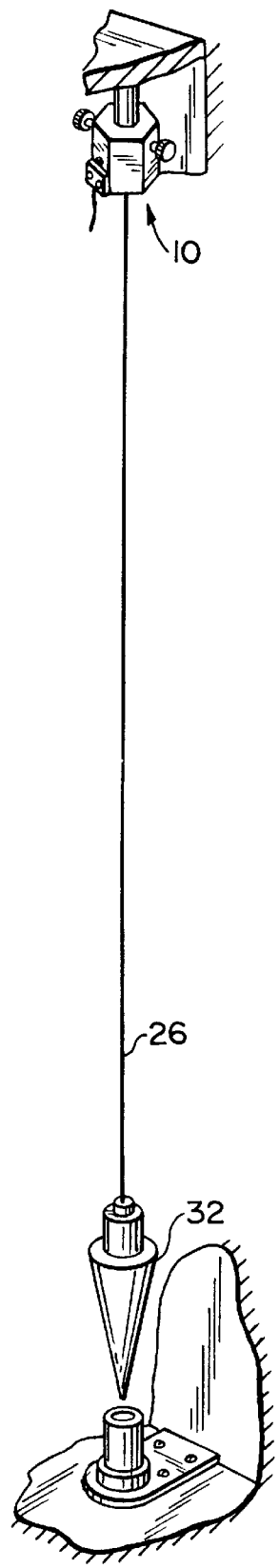
FIG. 2 is a partial perspective view of upper and lower pivots for a swinging door and a perspective view of the collar of this invention with a plumb having the apex of the plumb bob aligned with the center of the lower pivot.

In FIG. 1, the upper pivot assembly (shown in partial section) is generally designated as 10 and has an upper pivot rod 12. Surrounding pivot rod 12 is a collar, generally designated as 14, having a centrally disposed recess 16 dimensioned such that it snugly receives the pivot rod 12. Thumb screws 18 are provided to fixedly, but removably, attach the collar 14 onto the pivot rod 12. On the outer side surface 20 of the collar 14 is a plate 22 which is attached to the outer wall of the collar 14 through set screws 24. Disposed between the plate 22 and the outer side surface 20 of the collar 14 is a plumb line 26, which plumb line 26 extends through an aperture 28 in the side wall 36 of the collar 14 into the recess 16 and through the centrally disposed aperture 30 in the bottom of the recess 16. Attached to the plumb line 26 is a plumb bob 32 terminating in an apex 34.

Figure 3:
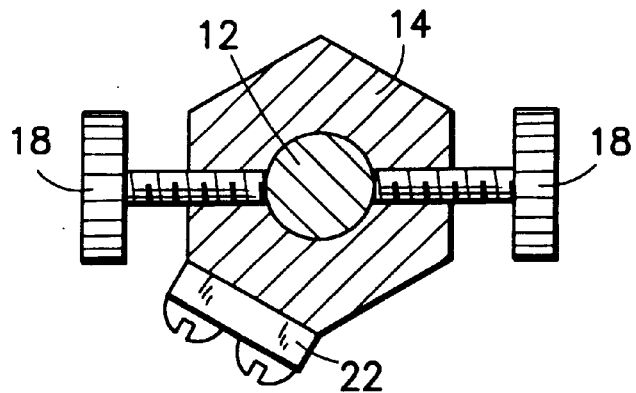
FIG. 3 is a cross-sectional view through the line 3—3 of FIG. 1.
Figure 4:
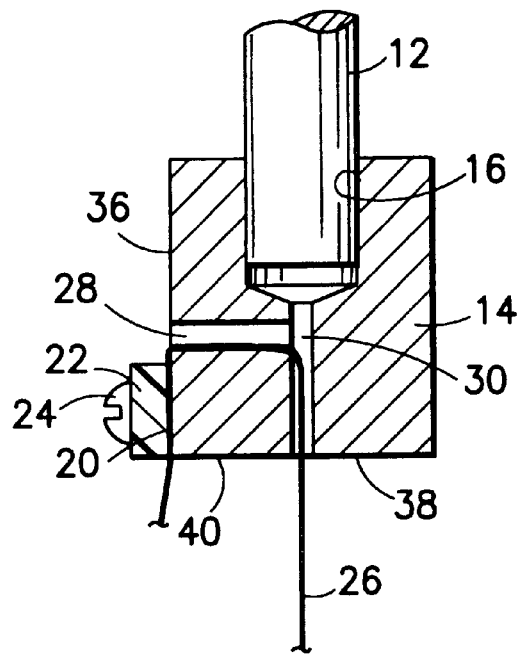
FIG. 4 is a cross-sectional view through the line 4—4 of FIG. 1.

Further structural details of the collar 14 are shown in FIGS. 3 and 4.

In FIG. 3, the collar 14 is shown fixedly but removably attached to the upper pivot rod 12 by thumb screws 18. Plate 22 is attached to the outer side surface 20 of the collar 14 through screws 24.

In FIG. 4, the upper pivot rod 12 is disposed in the recess 16 of the collar. Plate 22 is attached to the outer side surface 20 of the collar 14 through screw 24.

Aperture 28 extends through the side wall 36 of the collar 14 and centrally disposed aperture 30 extends through the bottom wall 40 of the collar 14. A portion of the plumb string 26 extends from below the plate 22, between the inside surface of the plate 22 and the outside surface of the collar 14, into the recess 16 and through the aperture 30.

In its preferred form the plate 22 is a material of construction that allows the plumb string 26 to slidably extend or retract so as to increase and decrease the length of the plumb string 26 and thereby to raise or lower the plumb bob from a position relative to the upper pivot rod. A suitable material for the plate 22 is teflon.

Figure 5:
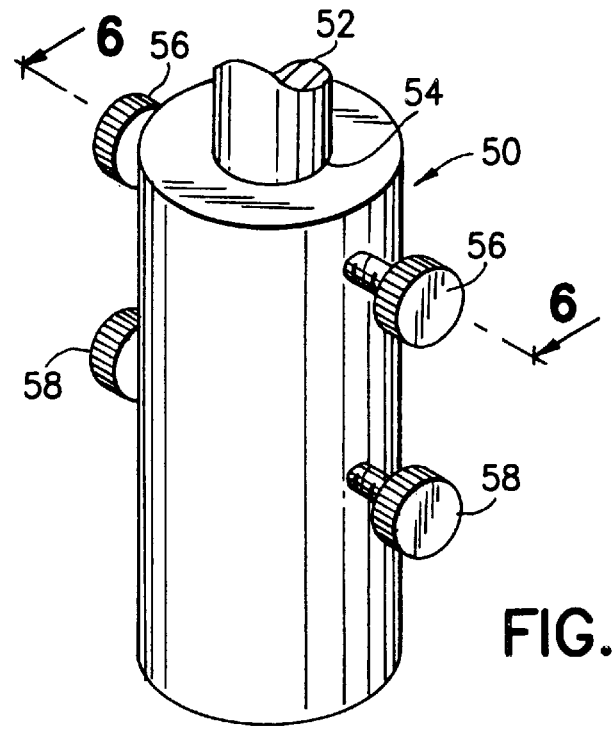
FIG. 5 is a perspective view of a collar to be used with a laser pen.

FIG. 5 shows a collar, generally designated as 50, mounted on an upper pivot 52 (shown in partial perspective), which collar has a recess 54 having a depth to receive a laser pen and the upper pivot 52. The upper set screws 56 hold the collar 50 to the upper pivot 52 and the lower set screws 58 stabilize the laser pen, shown best in FIG. 6, within the recess 54.

Figure 6:
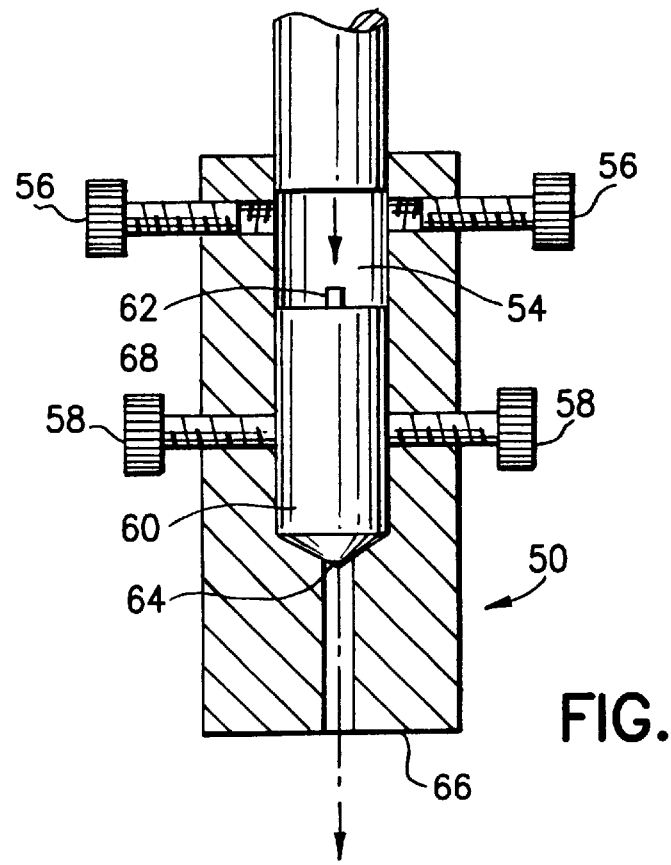
FIG. 6 is a cross-sectional view through the line 6—6 of FIG. 5.

In FIG. 6, the collar 50 has a centrally disposed recess 54, the recess 54 having a central aperture 64 which extends to the base 66 of the collar 50. Disposed within the lower portion 68 of the recess 54 is a laser pen 60 having a laser activating switch 62 mounted thereon. When the collar 50 is attached to the upper pivot 52 in its operative position, the upper pivot 52 and the laser pen 60 are contiguous, the underside of the upper pivot contacting the switch 62 to activate the laser pen and direct a laser beam through the aperture 64 to the locus on the surface below where the lower pivot of the swinging or revolving door should be positioned.

The collar is milled from a block of aluminum, brass or bronze and the recess milled to conform to the shape of the upper pivot rod, which pivot rods are usually cylindrical or square. The outer shape of the collar may be hexagonal as shown in FIG. 3, circular or a combination of circular and flat sided.

Many possible embodiments may be made without departing from the scope hereof; it is to be understood that all description herein set forth or shown in the accompanying drawings is to be interpreted as illustrative and not in a limiting sense.

I claim:

1. A collar and associated marker-generating means useful for aligning the upper and bottom pivot rods of a swinging or revolving door, comprising a collar having an upper recess for receiving the upper pivot rod such that the surface of the recess and outer surface of the upper pivot rod are in mating relation, means for removably but rigidly attaching the upper recess to the upper pivot rod and a central opening in the bottom surface of the collar in alignment with the longitudinal axes of the collar and the upper pivot rod; a plumb assembly including at least a plumb line and bob, said plumb line extending through an aperture in the side wall and into the recess of the collar and through the central opening in the bottom surface of the collar, which aperture in the side wall is disposed beneath the innermost extension of the upper pivot rod and means on the outer surface of the collar for engaging the plumb line so as to frictionally position the plumb bob against gravitational pull but release the plumb line to forward or backward movement upon application of manual pressure to the plumb line; the freehanging plumb bob acting to designate the proper positioning of the lower pivot rod.

2. The collar and associated marker-generating means of claim 1, and further wherein the means attached to the outer surface of the collar for positioning a plumb bob attached to a plumb string extending through the opening in the bottom surface of the recess in the collar is a plate contoured to the shape of that portion of the outer surface of the collar to which it is contiguous, the plate being affixed to the outer surface with sufficient force to hold the plumb string against gravitational movement but allow movement of the plumb string upon the application of a manual force to the plumb string.

3. The collar and associated marker generating means of claim 2, and further wherein the surface of the plate contiguous to the outside surface of the collar has an auto-lubrication property, such that movement of a plumb string passing between the inner surface of the plate and the outer surface of the collar will be facilitated upon the application of manual force to the plumb string.

4. The collar and associated marker generating means of claims 3 or 1, and further wherein the means for removably but rigidly attaching the collar to the pivot rod are thumb screws extending through apertures in the side wall of the collar.

* * * * *